(12) United States Patent
Ivner

(10) Patent No.: US 9,731,366 B2
(45) Date of Patent: Aug. 15, 2017

(54) SAW BLADE AND METHOD OF SHAPING A BACK EDGE OF A SAW BLADE

(71) Applicant: KAPMAN AB, Sandviken (SE)

(72) Inventor: Tomas Ivner, Lidköping (SE)

(73) Assignee: KAPMAN AB, Sandviken (SE)

( * ) Notice: Subject to any disclaimer, the term of this patent is extended or adjusted under 35 U.S.C. 154(b) by 109 days.

(21) Appl. No.: 14/411,808

(22) PCT Filed: Jul. 2, 2013

(86) PCT No.: PCT/SE2013/050848
§ 371 (c)(1),
(2) Date: Dec. 29, 2014

(87) PCT Pub. No.: WO2014/007743
PCT Pub. Date: Jan. 9, 2014

(65) Prior Publication Data
US 2016/0167143 A1    Jun. 16, 2016

Related U.S. Application Data

(60) Provisional application No. 61/667,674, filed on Jul. 3, 2012.

(30) Foreign Application Priority Data

Jul. 3, 2012   (SE) ...................................... 1250754

(51) Int. Cl.
*B23D 61/12* (2006.01)

(52) U.S. Cl.
CPC ......... *B23D 61/123* (2013.01); *Y10T 83/9317* (2015.04)

(58) Field of Classification Search
CPC ...... B23D 61/123; B23D 61/025; B27B 13/10
(Continued)

(56) References Cited

U.S. PATENT DOCUMENTS

| 1,850,478 A | 3/1932 | Schaefer |
| 4,023,448 A | 5/1977 | Bertini |

(Continued)

FOREIGN PATENT DOCUMENTS

| DE | 2748822 A1 | 5/1978 |
| DE | 27 03 948 A1 | 8/1978 |

(Continued)

OTHER PUBLICATIONS

International Search Report (PCT/ISA/210) mailed on Oct. 14, 2013, by the Swedish Patent Office as the International Searching Authority for International Application No. PCT/SE2013/050848.

(Continued)

*Primary Examiner* — Kenneth E Peterson
(74) *Attorney, Agent, or Firm* — Buchanan Ingersoll & Rooney PC

(57) ABSTRACT

A saw blade includes a first edge having teeth and a second edge principally opposed to the first edge, which second edge extends in a first principal direction of extension along a first part of its principal extension and in a second principal direction of extension along a second part of its principal extension, neither said first nor said second principal direction of extension being parallel to a principal direction of extension of said first edge, but said first principal direction of extension forming a first and positive angle (A) with said principal direction of extension of said first edge and said second principal direction of extension forming a second and negative angle (B) with said principal direction of extension of said first edge.

10 Claims, 2 Drawing Sheets

(58) Field of Classification Search
USPC .......................................................... 83/661
See application file for complete search history.

(56) References Cited

U.S. PATENT DOCUMENTS

| | | | |
|---|---|---|---|
| 4,195,543 A * | 4/1980 | Tapply | B23D 55/082 |
| | | | 76/112 |
| 4,205,571 A | 6/1980 | Bertini | |
| 4,423,653 A | 1/1984 | Howard | |
| 5,016,497 A | 5/1991 | Sundström | |
| 6,532,852 B1 * | 3/2003 | Tsujimoto | B23D 61/121 |
| | | | 83/661 |
| 2008/0121079 A1 | 5/2008 | Hashimoto et al. | |
| 2011/0259168 A1 | 10/2011 | Butzen et al. | |

FOREIGN PATENT DOCUMENTS

| | | |
|---|---|---|
| DE | 3432894 A1 | 3/1986 |
| DE | 19521247 A1 | 12/1996 |
| EP | 0795369 A2 | 9/1997 |
| EP | 1 795 289 A1 | 6/2007 |
| JP | 2008-168429 A | 7/2008 |

OTHER PUBLICATIONS

International Preliminary Report on Patentability (PCT/IPEA/409) mailed on May 28, 2014, by the Swedish Patent Office as the International Searching Authority for International Application No. PCT/SE2013/050848.

* cited by examiner

SAW BLADE AND METHOD OF SHAPING A BACK EDGE OF A SAW BLADE

The present invention concerns a saw blade comprising a first edge having teeth and a second edge principally opposed to the first edge, which second edge extends in a first principal direction of extension along a first part of its principal extension and in a second principal direction of extension along a second part of its principal extension, neither said first nor said second principal direction of extension being parallel to a principal direction of extension of said first edge, but said first principal direction of extension forming a first and positive angle with said principal direction of extension of said first edge and said second principal direction of extension forming a second and negative angle with said principal direction of extension of said first edge. The present invention also concerns a method of shaping a back edge of a saw blade.

PRIOR ART

U.S. Pat. No. 4,160,397 shows a design of a saw blade and a method to manufacture the same. The blade has a series of teeth formed along an edge in order to define a cutting edge. The blade has a back edge that is progressively leaning or conical in opposite directions from an intermediate point of the back edge. In the manufacture of the blade, the back edge is ground. A disadvantage of the disclosed design is that, in operation, it is subjected to unnecessary large endurance stresses, on one hand because of the geometry of the back edge and on the other hand because of the fact that the back edge is ground.

SUMMARY OF THE INVENTION

A first object of the present invention is to achieve a saw blade that in operation is subjected to lower endurance stresses than known corresponding saw blades. A second object of the present invention is to achieve a method of shaping a back edge of a saw blade. Thus, the invention embraces a saw blade comprising a first edge having teeth and a second edge principally opposed to the first edge, which second edge extends in a first principal direction of extension along a first part of its principal extension and in a second principal direction of extension along a second part of its principal extension, neither said first nor said second principal direction of extension being parallel to a principal direction of extension of said first edge, but said first principal direction of extension forming a first and positive angle with said principal direction of extension of said first edge and said second principal direction of extension forming a second and negative angle with said principal direction of extension of said first edge. Said second edge extends principally parallel to said first edge along a third part of its principal extension, said third part connecting said first part with said second part and said second part being longer than said first part in the principal direction of extension of the saw blade.

Said second part may be located ahead of said first part on the saw blade involving that said second part can pass the present workpiece before said first part does upon sawing. Said second edge may extend in said first principal direction of extension along a fourth part of its principal extension. Said second edge may extend principally parallel to said first edge along a fifth part of its principal extension, wherein said fifth part may connect said second part with said fourth part. Said fifth part may be positioned at a shorter principally perpendicular distance from the first edge than what said third part does.

Said third part may be shorter than said first part in the principal direction of extension of the saw blade. Said third part may be shorter than said second part in the principal direction of extension of the saw blade. Said third part may be longer than said first part in the principal direction of extension of the saw blade. Said fifth part may be shorter than said second part in the principal direction of extension of the saw blade.

Said fifth part may be shorter than said fourth part in the principal direction of extension of the saw blade. Said fifth part may be longer than said fourth part in the principal direction of extension of the saw blade.

Said third part may have a length of approx. 5-150 mm in the principal direction of extension of the saw blade. Said third part may have a length of approx. 10-50 mm in the principal direction of extension of the saw blade. Said fifth part may have a length of approx. 5-150 mm in the principal direction of extension of the saw blade. Said fifth part may have a length of approx. 10-50 mm in the principal direction of extension of the saw blade.

The saw blade may be a band saw blade.

Thus, the invention also embraces a method of shaping a back edge of a saw blade, the saw blade comprising a first edge having teeth and a second edge principally opposed to the first edge and corresponding to a back edge, which second edge extends in a first principal direction of extension along a first part of its principal extension and in a second principal direction of extension along a second part of its principal extension, neither said first nor said second principal direction of extension being parallel to a principal direction of extension of said first edge, but said first principal direction of extension forming a first and positive angle with said principal direction of extension of said first edge and said second principal direction of extension forming a second and negative angle with said principal direction of extension of said first edge. The back edge is shaped by milling.

The milling may be effected in the principal longitudinal direction of the saw blade.

LIST OF FIGURES

DESCRIPTION OF EMBODIMENTS

Figure 1:
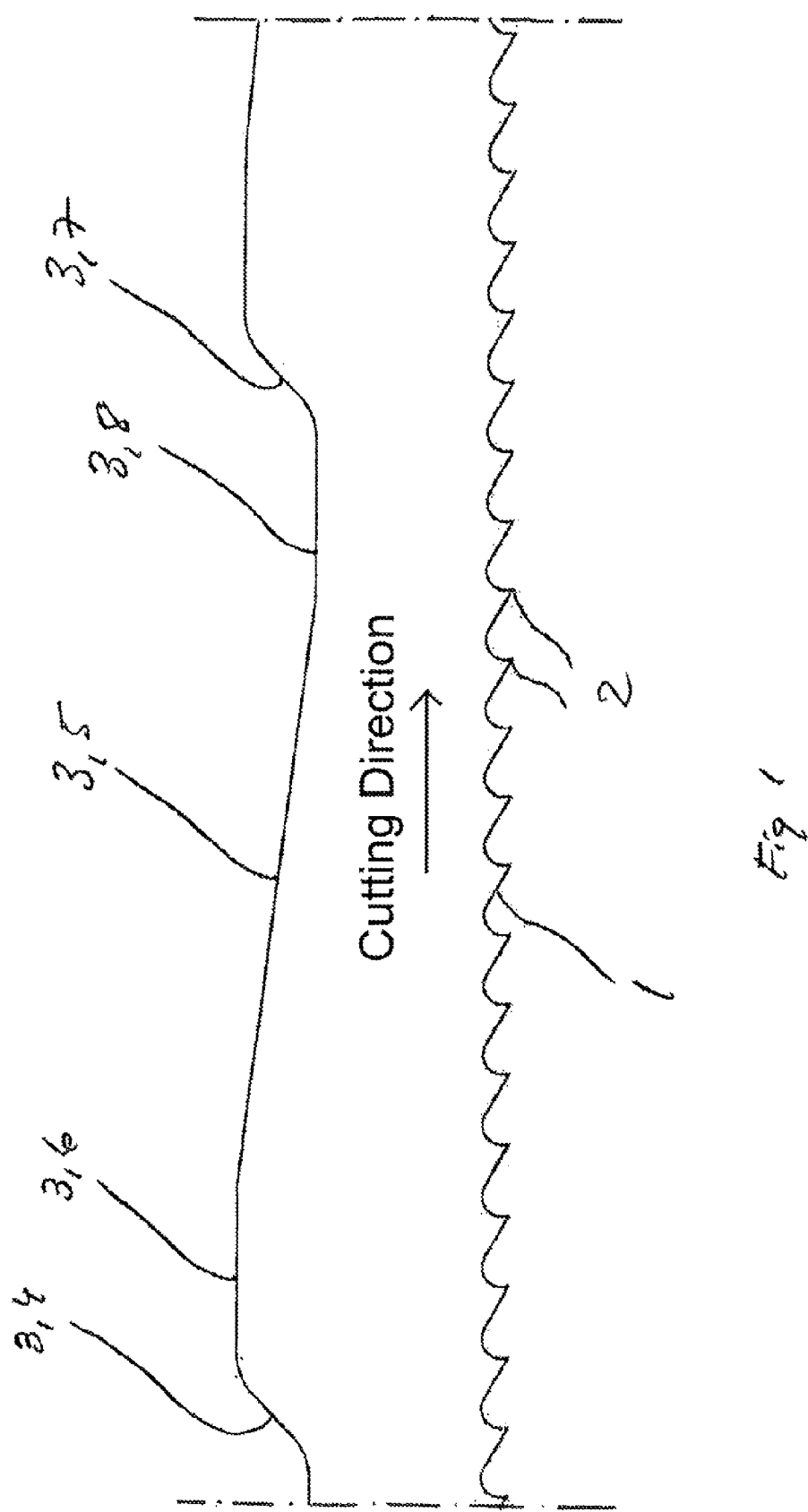
FIG. 1 shows, in a sectioned side view, a part of a saw blade according to the invention.
Figure 2:
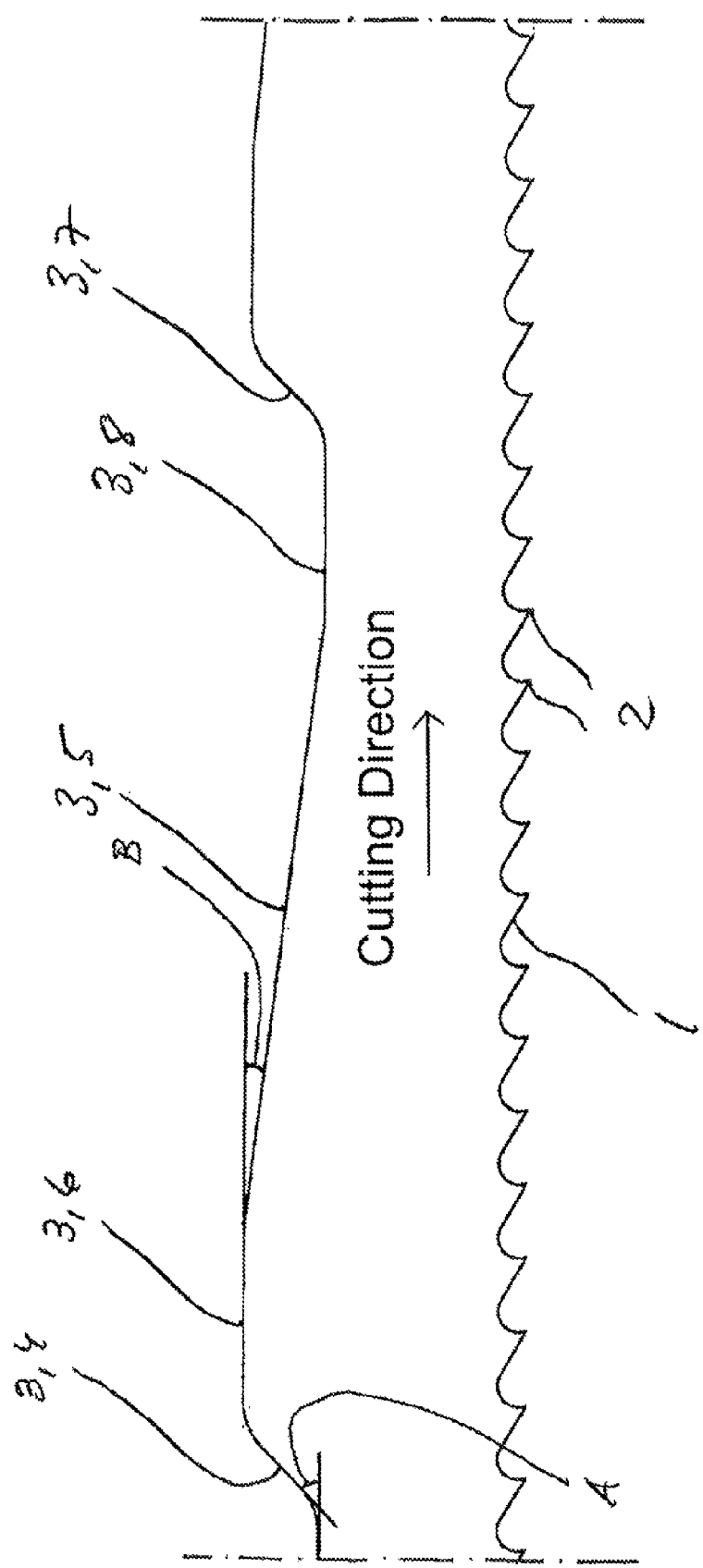
FIG. 2 shows, in a sectioned side view, the part of the saw blade in FIG. 1 indicating a positive angle A and a negative angle B.

In FIG. 1, it is seen what a part of a saw blade according to the invention looks like. The part is a part of a band saw blade that comprises a first edge 1 having teeth 2 and a second edge 3 that is principally opposed to the first edge 1 and forms a back edge 3 of the band saw blade. The first edge 1 extends straight and accordingly horizontally in FIG. 1 and parallel to the principal direction of extension of the blade as well as the principal longitudinal direction of the blade, while different parts of the back edge 3 extend in different principal directions of extension in relation to the first edge 1. Thus, a first part 4 of the back edge 3 extends in a first principal direction of extension in relation to the first edge 1. Correspondingly, a second part 5 of the back edge 3 extends in a second principal direction of extension in relation to the first edge 1. Neither the first nor the second principal direction of extension is parallel to the principal direction of extension of the first edge 1, but the first principal direction of extension forms a first and positive angle A with the principal direction of extension of the first edge 1 and the second principal direction of extension forms a second and negative angle B with the principal direction of extension of the first edge 1, see FIG. 2. Hence, if the part in question of the saw blade in the figures is held horizontally and with the first edge 1 downward, i.e., the principal direction of extension of the first edge 1 is horizontal as previously observed, the first angle A extends from an imaginary horizontal line and upward in the figures while the second angle B extends from an imaginary horizontal line and downward in the figures. However, a third part 6 of the back edge 3 extends parallel to the first edge 1 and the third part 6 connects the first part 4 with the second part 5. The parts transform smoothly into each other.

The second part 5 is longer than the first part 4 in the principal direction of extension of the saw blade and the second part 5 is located ahead of the first part 4 on the saw blade involving that the second part 5 passes the present workpiece before the first part 4 does upon sawing.

Furthermore, a fourth part 7 of the back edge 3 extends in said first principal direction of extension in relation to the first edge 1. A fifth part 8 of the back edge 3 extends parallel to the first edge 1 and the fifth part 8 connects the second part 5 with the fourth part 7. The parts transform smoothly into each other. The fifth part 8 is positioned closer to the first edge 1 than the third part 6 does, i.e., at a shorter perpendicular distance from the first edge 1 than the third edge 6 does. Said parts 4-8 occur periodically on the back edge 3 in such a way that the first part 4, the second part 5, the third part 6, and the fifth part 8 together make up a first group having parts that are followed by one or more identical groups on the back edge 3. The fourth part 7 is identical to and consists of the first part of the back edge 3 in a group of parts located next to the first group.

When the band according to the invention is used in a band saw, the back edge 3 rests against a pair of back edge guides (not shown) that are situated on both sides of the workpiece being sawn. The presence of the "flat" parts 6, 8, i.e., the third part 6 and the fifth part 8, contributes to reducing the contact pressure between the back edge guides and the blade in the points of the blade where stresses otherwise become the greatest in sawing, i.e., in areas of changes of direction for the back edge 3 in relation to the first edge 1. This is particularly important in the top of the curve that consists of the contour line of the back edge 3 in the figures, i.e., at the third part 6. The reduced contact pressure results in considerably improved endurance properties. In sawing, the blade in the figures moves from the left to the right in the figures.

In the embodiment according to the figures, the third part 6 of the back edge 3 is longer than the first part 4 but shorter than the second part 5 as counted in the principal direction of extension of the blade. Correspondingly, the fifth part 8 of the back edge 3 is longer than the first part 4, shorter than the second part 5, and longer than the fourth part 7 (that is identical to the first part 4) as counted in the principal direction of extension of the blade. Other relative length relationships are, however, fully feasible.

As previously mentioned, the first part 4 and the second part 5 are differently long. Analogously, it follows that the second part 5 and the fourth part 7 also are differently long and that the second part 5 is longer than the fourth part 7 in the principal direction of extension of the saw blade. The second part 5 is located after the fourth part 7 on the saw blade involving that the second part 5 passes the present workpiece after the fourth part 7 does upon sawing.

The wave-shaped back edge 3 according to the invention is shaped by milling, wherein it is feasible to use high-speed milling. The milling is effected in the longitudinal direction of the saw blade. The corners of the back edge and that normally are running in the entire length of the blade may be chamfered or rounded, wherein it is feasible to chamfer or round only one corner or both corners. The above mentioned shaping of the back edge 3 and the chamfering of at least one corner extending in the entire length of the blade or part of the length may be effected by milling in one and the same operation, wherein it also in this case is feasible to use high-speed milling.

The invention is not limited to the embodiments shown herein, but may be varied within the scope of the subsequent claims.

The invention claimed is:

1. A saw blade comprising a first edge having teeth and a second edge opposed to the first edge, which second edge extends in a first principal direction of extension along a first part and in a second principal direction of extension along a second part,
   neither said first nor said second principal direction of extension being parallel to a principal direction of extension of said first edge, but said first principal direction of extension forming a first and positive angle (A) with said principal direction of extension of said first edge and said second principal direction of extension forming a second and negative angle (B) with said principal direction of extension of said first edge, said first angle having a magnitude greater than a magnitude of said second angle,
   wherein said second edge extends parallel to said first edge along a third part, said third part connecting said first part with said second part and said second part being longer than said first part in the principal direction of extension of the saw blades,
   wherein said second edge extends in said first principal direction of extension along a fourth part and said second edge extends parallel to said first edge along a fifth part, said fifth part connecting said second part with said fourth part, and wherein said third part and said fifth part each have a length in the principal direction at least twice as long as a pitch of the teeth,
   wherein said third part and said fifth part are shorter than said second part in the principal direction,
   wherein said third part and said fifth part have a length in the principal direction at least twice as long as a pitch of the teeth.

2. Saw blade according to claim 1, wherein said second part is located ahead of said first part on the saw blade involving that said second part passes the present workpiece before said first part does upon sawing.

3. Saw blade according to claim 1, wherein said fifth part is positioned at a shorter perpendicular distance from the first edge than said third part does.

4. Saw blade according to claim 1, wherein said third part is longer than said first part in the principal direction of extension of the saw blade.

5. Saw blade according to claim 1, wherein said fifth part is longer than said fourth part in the principal direction of extension of the saw blade.

6. Saw blade according to claim 1, wherein said third part has a length of 5-150 mm in the principal direction of extension of the saw blade.

7. Saw blade according to claim 1, wherein said third part has a length of 10-50 mm in the principal direction of extension of the saw blade.

8. Saw blade according to claim 1, wherein said fifth part has a length of 5-150 mm in the principal direction of extension of the saw blade.

9. Saw blade according to claim 1, wherein said fifth part has a length of 10-50 mm in the principal direction of extension of the saw blade.

10. Saw blade according to claim 1, wherein the saw blade is a band saw blade.

* * * * *